(12) United States Patent
Otsuka

(10) Patent No.: US 6,431,956 B1
(45) Date of Patent: Aug. 13, 2002

(54) SURFACE TREATMENT IN A FABRICATION OF A MULTILAYERED CHIP COMPONENT

(75) Inventor: Koji Otsuka, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 09/608,032

(22) Filed: Jun. 30, 2000

(30) Foreign Application Priority Data

Jun. 30, 1999 (JP) .............................. 11-186316
Aug. 11, 1999 (JP) .............................. 11-227128

(51) Int. Cl.$^7$ .............................................. B24B 31/02
(52) U.S. Cl. .................................... 451/35; 451/32
(58) Field of Search ........................... 451/32, 34, 35, 451/326, 327, 328, 329, 330

(56) References Cited

U.S. PATENT DOCUMENTS

| | | | | |
|---|---|---|---|---|
| 3,612,963 A | * | 10/1971 | Piper et al. | 317/261 |
| 4,750,084 A | * | 6/1988 | Nikaidoh et al. | 361/321 |
| 5,140,783 A | * | 8/1992 | Hoffman | 451/32 |
| 5,312,581 A | * | 5/1994 | Amano et al. | 419/8 |

* cited by examiner

Primary Examiner—Robert A. Rose
(74) Attorney, Agent, or Firm—Katten Muchin Zavis Rosenman

(57) ABSTRACT

An inventive method for fabricating a multilayered ceramic electronic component comprises the steps of: preparing a multilayered ceramic body and abrasive powders into an abrader; abrading the multilayered ceramic body for smoothing edge portions of the multilayered ceramic body; and separating the multilayered ceramic body from the abrasive powders, wherein the abrasive powders are porous and includes fat and oil, in such a way that the abrasive powders allow undesirable wastes produced from the multilayered ceramic body to adhere thereto during the abrading step, thereby resulting in preventing internal or external electrodes of the multilayered ceramic body from being contaminated by the undesirable wastes, and improving the electrical properties of the multilayered ceramic electronic component.

20 Claims, 5 Drawing Sheets

SURFACE TREATMENT IN A FABRICATION OF A MULTILAYERED CHIP COMPONENT

FIELD OF THE INVENTION

The present invention relates to a method for fabricating a multilayered chip component or a multilayered ceramic electronic component; and, more particularly, to a step of surface-treating a multilayered ceramic body in the method.

DESCRIPTION OF THE PRIOR ART

A multilayered chip component or a multilayered ceramic electronic component such as a multilayered ceramic capacitor has a stacked ceramic layers and internal electrodes in the form of a conductive film disposed therebetween. In the fabrication of such a multilayered ceramic electronic component, bare ceramic green sheets are fabricated first from a slurry obtained by mixing ceramic powders with a binder solution including therein an organic binder, a dispersing agent and a solvent. Internal electrode patterns are then printed on the ceramic green sheets by using, e.g., screen printing technique. The ceramic green sheets having the internal electrode patterns printed thereon are then stacked to form a ceramic body and the resultant laminated ceramic body is then diced into a plurality of chip-shaped multilayered ceramic bodies. These chip-shaped multilayered ceramic bodies are sintered after removing the organic materials such as an organic binder and a solvent.

In order to prevent the multilayered ceramic body from being improperly set or from being partially broken off when the multilayered ceramic body is loaded on the substrate, a surface treatment such as an abrasion is applied to the multilayered ceramic body to smooth edge portions of the multilayered ceramic body prior to the completion of the multilayered ceramic electronic component, wherein the multilayered ceramic body and abrasive powders are stirred together after being charged into an abrader.

However, if the abrasion is applied prior to the formation of external electrodes, undesirable wastes produced in the process from the multilayered ceramic body adhere to exposed portions of the internal electrodes during the abrasion, in such a way that during the sintering of the multilayered ceramic body, the undesirable wastes react with the internal electrodes at high temperature, thereby covering the exposed portions of the internal electrodes. This causes for electrical disconnections between the internal electrodes and the external electrodes, thereby resulting in the deterioration of the electrical property of the multilayered ceramic electronic component. Alternatively, if the abrasion is applied posterior to the formation of the external electrodes, the undesirable wastes produced in the process adhere to the external electrodes, in such a way that when a metal coating is formed on the external electrodes, the metal coating will have non-uniform thickness and weak adhesive force, thereby being easily delaminated and, hence again, resulting in the deterioration of the electrical property of the multilayered ceramic electronic component.

SUMMARY OF THE INVENTION

It is, therefore, a primary object of the invention to provide a method for fabricating a multilayered ceramic electronic component, capable of preventing a multilayered ceramic body from being contaminated by undesirable wastes produced in the process from the multilayered ceramic body during an abrading step.

In accordance with one aspect of the present invention, there is provided a method for fabricating the multilayered ceramic electronic component comprising the steps of: preparing a multilayered ceramic body and abrasive powders into an abrader; abrading the multilayered ceramic body for smoothening edge portions of the multilayered ceramic body; and separating the multilayered ceramic body from the abrasive powders, wherein the abrasive powders are porous and include fat and oil, in such a way that the abrasive powders allow the undesirable wastes produced in the process from the multilayered ceramic body to adhere thereto during the abrading step.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

Detailed description of preferred embodiments of the present invention will be presented with reference to the drawings hereinafter.

The major constituent of the raw materials of the dielectric used for forming ceramic layers of typical multilayered ceramic capacitor is $BaTiO_3$. Normally, glass components mainly composed of $Si_2O_3$, $B_2O_3$ and $Li_2O_3$ are also added in order to lower the sintering temperature. Oxides of rare-earth elements such as Y, La, Ce, Pr, Nd, Pm, Sm, Eu, Gd, Tb, Dy, Ho, Er, Tm, Yb or Lu, or the transition metals, e.g., Sc, Ti, V, Cr, Mn, Fe, Co or Ni are also preferably added to the composition in order to adjust the resistance to reduction or temperature characteristics.

As exemplary process for preparing the dielectric ceramic composition for forming ceramic layers of the mulilayered ceramic capacitor is as follows.

First, the predetermined amounts of starting materials are mixed in, e.g., a ball mill with water. Thereafter the mixture is dried by a spray drier or the like and calcined at a temperature ranged from 800° C. to 1300° C. for 2 to 10 hours to obtain dielectric oxides, which are then ground in a ball mill, jet mill or the like into particles of desired size.

Next, a slurry is prepared by mixing the ground dielectric material obtained above with an organic binder and a solvent, e.g., in a ball mill, a basket mill or bead mill. A plasticizer and a dispersing agent may be added, if necessary.

The binder may be selected from, for example, abietic resin, polyvinyl butyral, ethyl cellulose or acrylic resin. The solvent may be selected from, e.g., ethanol, terpineol, butyl carbitol, toluene or kerosene. The plasticizer may be selected from, e.g., abietic acid derivative, diethyl oxalic acid, polyethylene glycol, polyalkylene glycol, phthalate ester, dibuthyl phthalate. The dispersing agent may be selected from, e.g., glycerin, octadecyl amine, trichloroacetic acid, oleic acid, octadiene, ethyl oleate, glycerol monooleate, glycerol trioleate or glycerol tristearate.

The slurry is typically composed of 30 to 80 weight % of dielectric material, 2 to 5 weight % of binder, 0.1 to 5 weight % of plasticizer, 0.1 to 5 weight % of disperse agent and 20 to 70 weight % of solvent.

Figure 1:
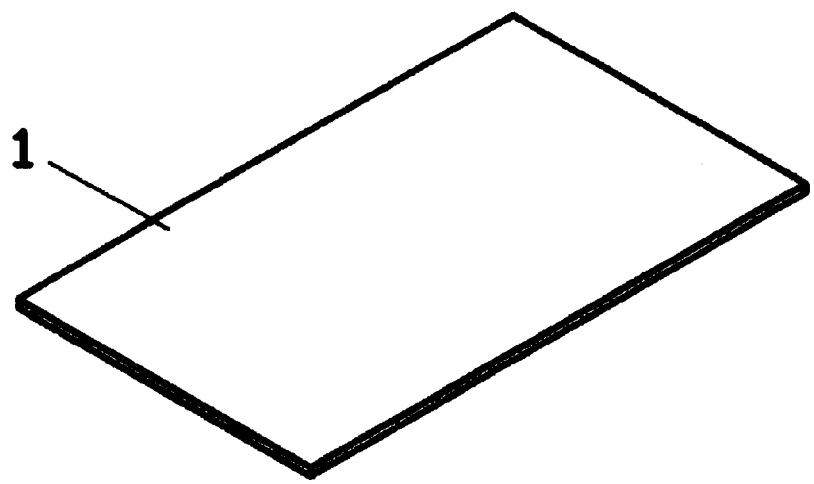
FIG. 1 shows a perspective view of a ceramic green sheet.

Thereafter, the ceramic green sheets of 1 to 20 µm thickness are formed from the slurry by using, for example, a doctor blade, a die coater or a reverse coater. These ceramic green sheets are then cut into a number of ceramic green sheets 1 of a desired size as shown in FIG. 1.

Figure 2:
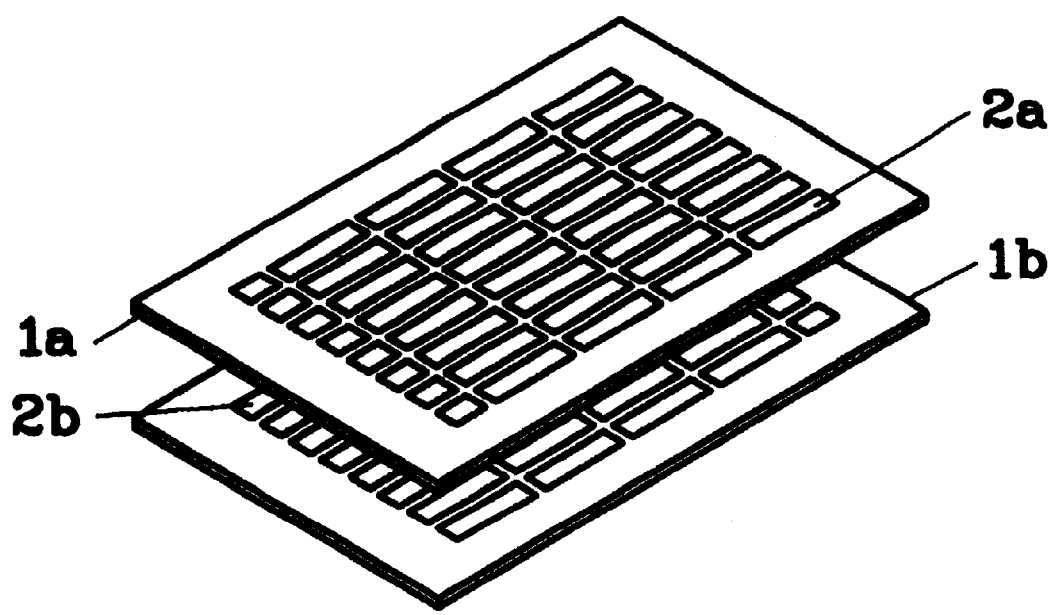
FIG. 2 provides a perspective view of two ceramic green sheets with internal electrode patterns printed thereon.

Then, as shown in FIG. 2, internal electrode patterns 2a, 2b are printed on the surfaces of ceramic green sheets 1a, 1b.

A paste for the internal electrodes is prepared by mixing a conductive material with organic material. The conductive material may be selected from base metals such as Ni, Cu or a compound or a mixture thereof. There are no particular restrictions on the shape of these materials; and, for example, materials of a sphere-shape, a ring-shape or the mixture thereof may be used. The average diameter of the particles of the conductive material is about 0.1 to 10 µm, and more preferably 0.1 to 1 µm. The organic materials include a binder and a solvent. The binder may be selected from ethyl cellulose, acrylic resin or butyl resin or any other conventional binder and may be included by 1 to 10 weight %. The solvent may be selected from terpineol, butyl carbitol or any other conventional solvent and may be included by 20 to 55 weight %. The paste may also contain additives of less than 10 weight %, which includes, e.g., a dispersing agent such as sorbitan fatty acid ester and glycerin fatty acid ester, a plasticizer such as dioctyl phthalate, dibutyl phthalate and butyl phtaryl glicoric butyl; and/or various kinds of ceramic powders, e.g., dielectric or insulation materials for preventing delamination and sintering of the electrode patterns. An organic metal resinate may also be included in the additives.

The paste for the internal electrodes is printed onto the surfaces of the ceramic green sheets to form two types of patterns 2a, 2b as shown in FIG. 2 by employing printing method, a pattern transferring method or a sheeting method. In FIG. 2, the ceramic green sheets having the internal electrode patterns 2a, 2b printed thereon are labeled as 1a, 1b in order to distinguish them from the bare ceramic green sheets 1 having no internal electrode patterns printed thereon.

Figure 3:
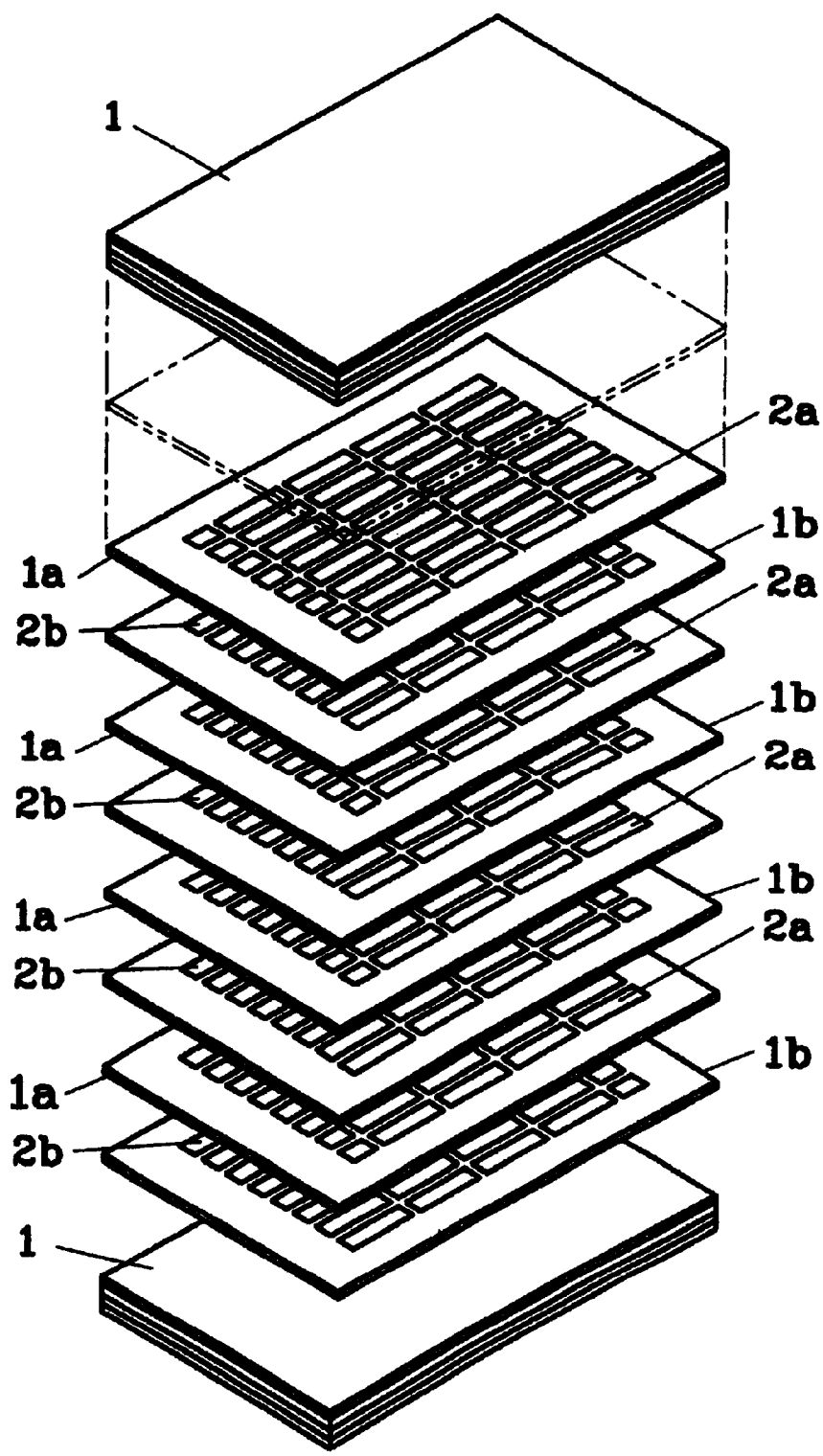
FIG. 3 represents an exploded perspective view depicting a step of stacking ceramic green sheets.
Figure 4:
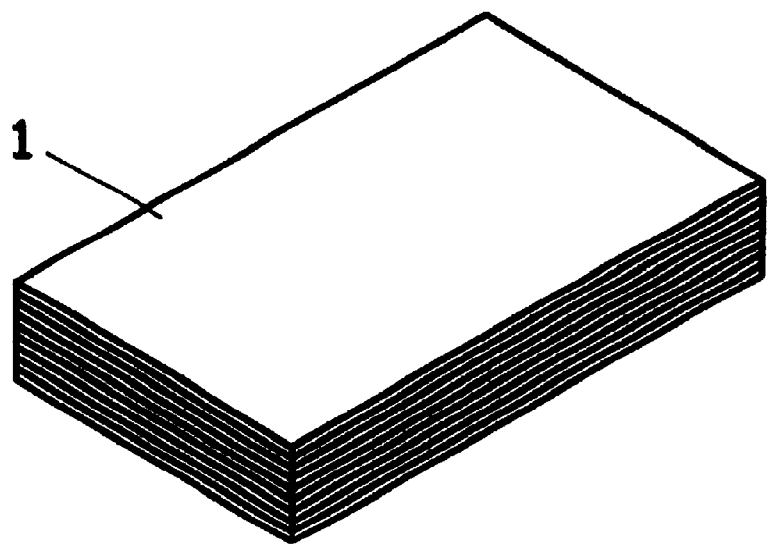
FIG. 4 is a perspective view of a laminated ceramic body achieved by stacking the ceramic green sheets.

The two types of ceramic green sheets 1a, 1b with different internal electrode patterns 2a, 2b, respectively, are stacked alternately; and the bare ceramic sheets 1 without the internal electrode patterns 2a, 2b are stacked against the outermost sheets of the stacked ceramic sheets 1a, 1b, as dummy sheets as shown in FIG. 3. Thereafter, these stacked ceramic green sheets 1a, 1b are pressed to form a laminated ceramic body shown in FIG. 4. The laminated ceramic body may also be formed by employing the so-called slurry built method wherein the laminated ceramic body is fabricated by forming and printing ceramic green sheets and internal electrode patterns in a desired order on a starting ceramic green sheet.

Figure 5:
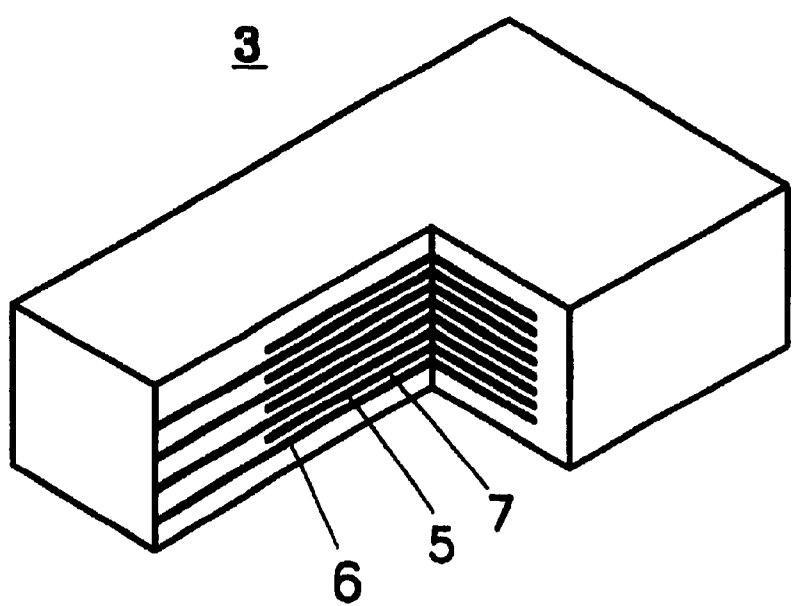
FIG. 5 offers a perspective view of a multilayered ceramic body, wherein the multilayered ceramic body is partially sectioned.
Figure 6:
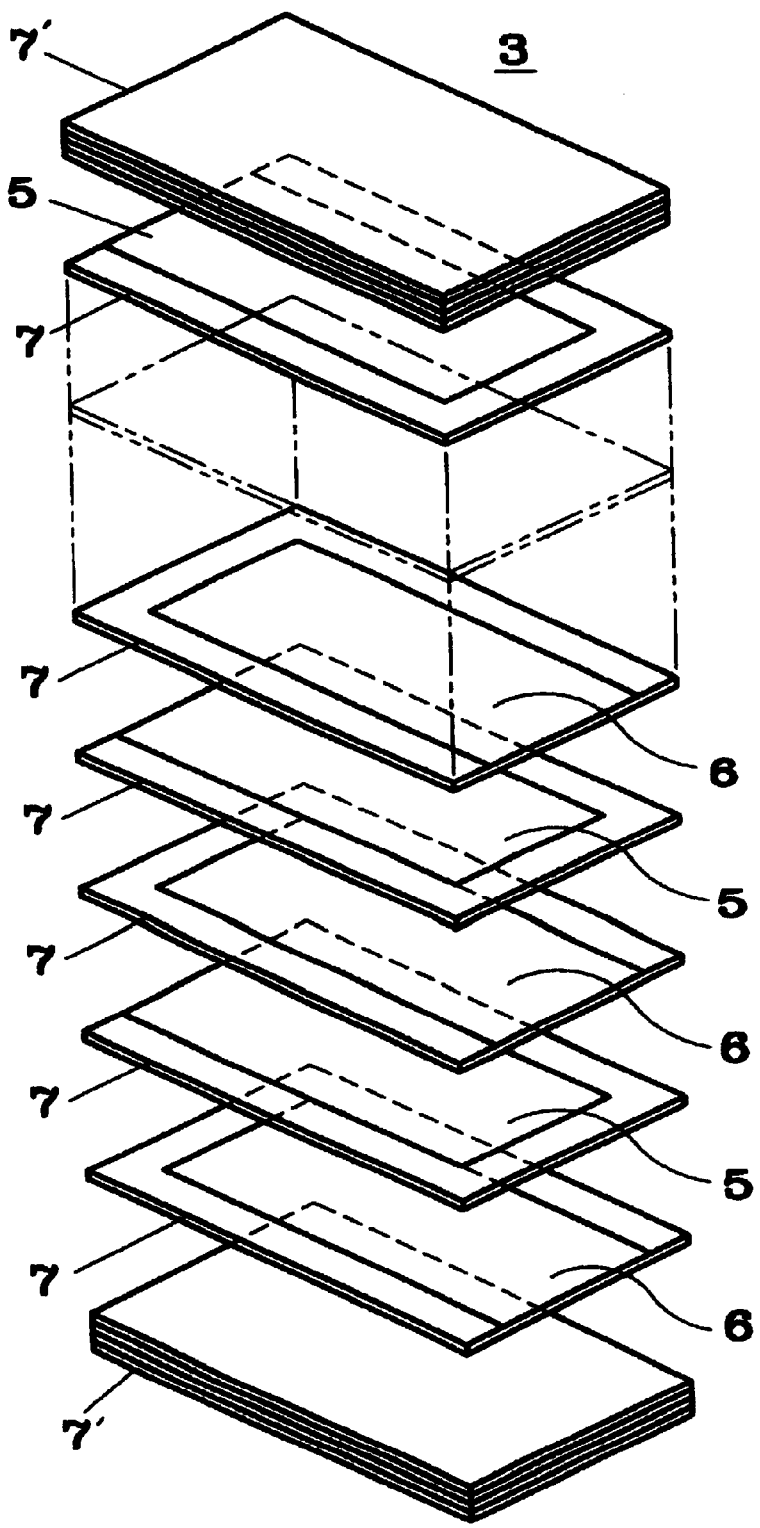
FIG. 6 shows an exploded perspective view of the multilayered ceramic body.

The laminated body is diced into chip-shaped multilayered ceramic body 3 as shown in FIG. 5. Each of the multilayered ceramic bodies 3 includes a plurality of stacked ceramic layers 7, each alternately having internal electrode 5 or 6 exposed on two opposite sides as shown in FIG. 6. Stacked on each of two outermost layers of the stacked ceramic layers 7' are a multiplicity of bare ceramic layers 7 having no internal electrodes thereon.

The shape and the size of the multilayered ceramic capacitor obtained this way can be adjusted depending on the requirements in the applications. For instance, the size of a hexahedron-shaped multilayered ceramic chip capacitor is normally 1.0–3.2 mm×0.5–1.6 mm×0.5 1.6 mm.

Subsequently, the multilayered ceramic bodies 3 are subject to a binder removing process.

Then, the multilayered ceramic bodies 3 are abraded to smooth edge portions thereof by stirring a mixture of the multilayered ceramic bodies 3 and abrasive powders after taking them into an abrader. Posterior to the sintering, the multilayered ceramic body 3 is hard and brittle. On the other hand, prior to the sintering, the multilayered ceramic body 3 is soft and not brittle. Accordingly, in comparison with the case of the abrasion applied posterior to the sintering, the abrasion applied prior to the sintering can shorten the time needed for the abrasion and reduce the risk for disforming in the multilayered ceramic bodies 3.

However, the abrasive powders can be utilized to make the undesirable wastes produced in the process from the multilayered ceramic bodies 3 adhere thereto during the abrasion. Preferably, the abrasive powders are a porous material made of, e.g., ceramic, metal or organic material.

Preferably, porous portion of the abrasive powders is about 10 to 75%, wherein if the porous portion of the abrasive powders is less than 10%, it is hard for the undesirable wastes produced to adhere to the abrasive powders and, in contrast, if the porous portion of the abrasive powders is more than 75%, hardness of the abrasive powders becomes low, thereby resulting in the abrasive powders getting pressed out of shape.

The abrasive powders preferably contain fat and oil, wherein the content of fat and oil is about 0.05 to 1.00 weight %. If the content of fat and oil is less than 0.05 weight %, it is hard to maintain the adhesion between the abrasive powders and the undesirable wastes produced and, in contrast, if the content is more than 1.00 weight %, the excessive fat and oil will remain on surfaces of the multilayered ceramic body 3, thereby deteriorating the electrical properties of the multilayered ceramic electronic component.

While the vegetable fat and oil are preferred, it is not limited thereto. Industrial fat and oil may be used.

Additionally, the abrasive powders may contain resins having weak adhesivity to promote the adhesion between the undesirable wastes produced and the abrasive powders.

Preferably, the abrasive powders include about 1.0–5.0 of Mou's hardness and about 0.9–1.5 of specific gravity. The above-mentioned values of hardness and specific gravity are optimum for the abrasion without disforming in the multilayered ceramic bodies 3.

The abrasive powders preferably include particles whose average diameter is about 0.1 to 0.5 mm. The above-mentioned mean particle size is optimum for forming the smooth and uniform edge portions of the multilayered ceramic bodies 3 in the abrasion.

As the hardness of the multilayered ceramic body 3 is high or low, the hardness of the abrasive powder to be used should follow accordingly high or low within the above range of the Mou's hardness, respectively. Similarly, as the specific gravity of the multilayered ceramic body 3 is high or low, the specific gravity of the abrasive powder to be used should follow accordingly high or low within the above range of the gravity, respectively. Likewise, as the dimension of the multilayered ceramic body 3 is large or small, the size of the abrasive powder to be used should also follow accordingly large or small within the above range of the mean particle size, respectively. In particular, the mean particle size of the abrasive powders to be used is much preferred to be sufficiently smaller than the dimension of the multilayered ceramic body 3 so as to uniformly smoothen the edge portions 8 of the multilayered ceramic body 3 and to easily separate the multilayered ceramic bodies 3 from the abrasive powders.

Figure 7:
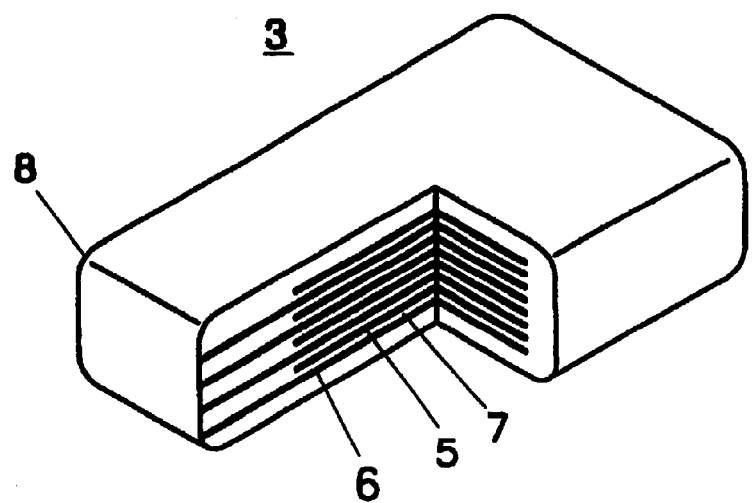
FIG. 7 is a perspective view of the multilayered ceramic body after an abrading step, wherein the multilayered ceramic body is partially sectioned.

The multilayered ceramic body 3 and the abrasive powders are mixed by a weight ratio of about 1:3 to 3:1 and are stirred for 10 to 300 minutes. The abrasion is performed on the multilayered ceramic body 3 to smoothen the edge portions 8 and corners where faces of the multilayered ceramic body 3 meet together, as shown in FIG. 7.

Posterior to the abrasion, the mixture of the multilayered ceramic body 3 and the abrasive powders are separated by passing them through a sieve, wherein the dimension of sieve opening should be larger than the mean particle size of the abrasive powder and smaller than the minimum dimension of the multilayered ceramic body 3.

After the foregoing abrasion and separation, a surface inspection of the multilayered ceramic body 3 by using a microscope shows that the undesirable wastes produced are extremely rarely observed to be adhered to the surface of the multilayered ceramic body 3. Furthermore, an interior inspection of the abrasive powders by using an electron microscope shows that the undesirable wastes produced are observed to be adhered inside of the porous of the abrasive powders.

Thereafter, the multilayered ceramic bodies 3 are sintered in a tunnel furnace or a box furnace capable of controlling an atmosphere therein.

Figure 8:
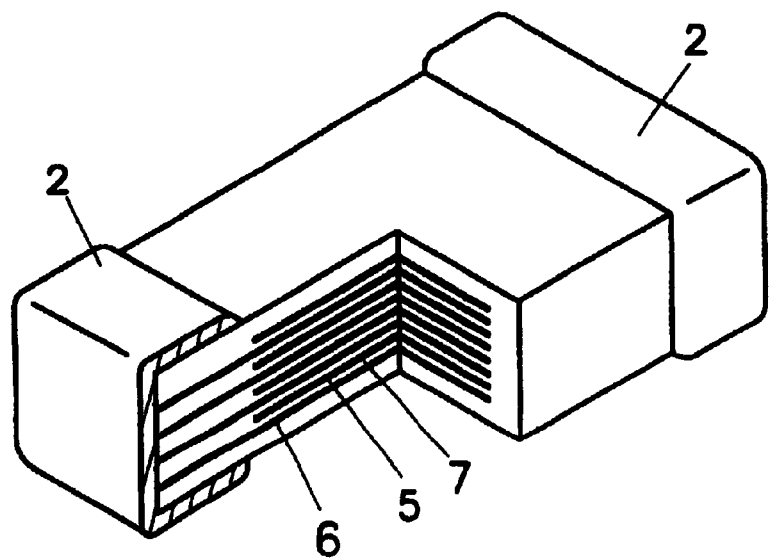
FIG. 8 offers a perspective view of the multilayered ceramic electronic component that is partially sectioned.

After the sintering of the multilayered ceramic body 3, external electrodes 2 are formed at the ends of the multilayered ceramic body 3, as shown in FIG. 8. In general, the external electrodes 2 are made of a metal selected from, e.g., Ni, Ni-alloy, Cu, Cu-alloy, Ag, Pd, or alloy thereof. Alternatively, the external electrodes 2 can be made of a conductive paste, wherein the conductive paste is coated on the multilayered ceramic body 3 by using a dip method and, then, they are heat-treated at a temperature in a range of about 600 to 1000° C. in a neutral or a reducing environment. On the other hand, if a conductive paste is coated on the multilayered ceramic body 3 before the sintering, the additional heat-treating step is unnecessary because it can be effected during the sintering. Alternatively, the external electrodes 2 may be formed by using a dry method such as a deposition or a sputtering method.

As described above, it is possible that the abrasion for smoothening the edge portions 8 of the multilayered ceramic body 3 is applied posterior to the sintering thereof. In this case, the abrasion should be preferably applied after the formation of the external electrode 2, which, in turn, can effectively reduce the amount of the undesirable wastes adhered on the multilayered ceramic body 3 and, at the same time, eliminate oxidizations formed on the external electrodes 2, thereby achieving an improvement in the formation of a metal coating on the external electrodes 2. Additionally, it is also possible that the abrasion can be applied twice, once before the formation of the external electrodes 2 and then once after the sintering, thereby achieving an improvement in the formation of the external electrodes 2 on the edge potions 8 of the multilayered ceramic body 3 as well as improvement in the formation of the metal coating.

Whenever the abrasion is applied, the abrasion will provide the smooth edge portions for the multilayered ceramic body 3, which will, in turn, prevent the mulilayered ceramic capacitor from being improperly set in the carrying pipe suit when the multilayered ceramic capacitor is loaded on the substrate by using a multi-mounting device.

The present invention has been described with respect to the multilayered ceramic capacitors. However, it should be appreciated to those skilled in the art that the present invention can be equally applied any other types of-multilayered ceramic electronic components, including multilayered ceramic inductors and multilayered ceramic composite components, having various ceramic materials and internal electrode patterns with different stacking sequences.

The present invention will be described in more detail by way of examples.

EXAMPLE 1

Example 1 will be described first. A pot mill is charged with alumina balls and 2.5 liters of water and previously synthesized oxide materials including 0.96 part by mole of $BaTiO_3$ having purity of 99% or high, 0.05 part by mole of MgO having purity of 99% or higher, 0.01 part by mole of ZnO, 0.03 part by mole of $TiO_2$ and 0.005 part by mole of $Ho_2O_3$, and the resulting mixture is stirred for 15 hours.

The stirred mixture is charged into a stainless pot and dried at 150° C. for 4 hours with a hot air dryer; and the dried mixture is pulverized into coarse particles, and the resultant particles are then calcined in air at approximately 1200° C. for 2 hours in a tunnel furnace, thereby producing powder of the first basic component.

Thereafter, 98 parts by mole of the powder of the first basic component and 2 parts by mole of powder of $CaZrO3$ (the second basic component) are weighed, and 2 parts by weight of an additive component (0.20 Li2O—0.60 SiO2—0.04 SrO—0.10 MgO—0.06 ZnO) are added to 100 parts by weight of the mixture of the basic components. In addition, 15 weight % of an organic binder including a butyral based resin and 50 weight % of ethanol are also added to the mixture of the basic and the additive components, the weight % of the binder and ethanol being measured with respect to the total weight of the mixture of the basic and the additive components. The resulting mixture is then ground and mixed in a ball mill to form a slurry.

The slurry is transferred to a reverse roll coater, thereby forming a thin coat on a long polyester film. The thin coat formed on the polyester film is then heated and dried at 100° C., thereby yielding a ceramic green sheet having a film thickness of approximately 20 μm. The sheet is then cut into a plurality of square sheets having 10 cm×10 cm.

The conductive paste for the internal electrodes is prepared by dissolving 10 g of nickel powder having a mean particle size of 1.0 μm and 0.9 g of ethyl cellulose in 9.1 g of butyl carbitol and stirring the mixture for 10 hours with a stirrer. The resulting conductive paste is printed on one side of the ceramic green sheet through a screen having a certain pattern and then dried.

Thereafter, 33 sheets of such ceramic green sheets are stacked with their printed sides directed upward. The two adjacent sheets are arranged in a manner that the upper sheet is shifted from the lower sheet by about a half of one pattern size along the lengthwise direction, thereby forming a laminated body. Further, a plurality of bare ceramic green sheets without having the internal electrode patterns thereon are stacked on each of the top and bottom surface of the laminated body, and then pressed with a vertical load of approximately 40 tons at a temperature of about 50° C. Thereafter, the resulting laminated ceramic body is diced into chip-shaped multilayered ceramic bodies.

Then, the multilayered ceramic bodies are abraded to smooth the edge portions thereof by charging the multilayered ceramic body and abrasive powders into a barrel abrader at the weight ratio of 2:1 and then rotating the barrel by 100 rpm/min for 15 minutes. Preferably, the abrasive powders are, e.g., porous hydroxyapatite ($Ca_5(PO_4)OH$) having about 0.3 mm of a mean particle size and 0.2 weight % of vegetable fat and oil is impregnated in the abrasive powders.

Subsequently, the multilayered ceramic bodies are heat-treated up to a temperature of 400° C. with a ramping rate of 60° C. per hour in the furnace having reductive atmosphere with $N_2$ in order to remove organic binders.

While maintaining the reductive atmosphere, the $N_2$ is then changed to $H_2$ (2 volume %) and $N_2$ (98 volume %). Under such reductive atmosphere, the chip-shaped multilayered ceramic bodies are heated up to a sintering temperature of 1200° C. with the ramping rate of 100° C. per hour. The temperature is maintained at the maximum point, i.e. 1200° C. for three hours, and then cooled down to 600° C. at the decreasing rate of 100° C. per hour. Also, the atmosphere in the furnace is changed to air (oxidative atmosphere) and oxidation is carried out at 600° C. for 30 minutes. Thereafter, the multilayered ceramic bodies are cooled down to room temperature, thereby yielding multilayered sintered ceramic bodies.

Subsequently, two end portions including the side surfaces of the multilayered sintered ceramic bodies where the internal electrodes are exposed are coated with a conductive paste including copper, glass frit and a vehicle, and then are dried. The bodies are baked at 650° C. for 15 minutes in the air, thereby forming copper electrode layers. Next, nickel layers are plated on the copper electrode layers by means of an electroless plating method, and Pb-Sn soldering layers are formed thereon by means of an electroplating method, thereby forming a pair of external electrodes.

From the finished multilayered ceramic capacitors, 50 capacitors are randomly selected and their capacitances are measured under the condition of 20° C. of temperature, 1 kHz of frequency and 1.0 V of voltage by using HP4284A from Hewlett-Packard. Thereafter, the mean(X) and the standard deviation($\sigma$) of the measured capacitances are calculated. The finished multilayered ceramic capacitors are determined as acceptable when a value calculated by a below equation is within 3% or less.

$\sigma$(standard deviation)/x(mean)×100

Results of the embodiments are represented in Table 1 described herebelow. The embodiments marked such as "*" in front of No. show results out of the range of the present invention.

Additionally, in Table 1, an item of "fat and oil" corresponds to the weight of the additive fat and oil with respect to the weight of the abrasive powders employed in the abrading step of the multilayered chip capacitor and an item of "porous rate" corresponds to the weight per unit area of real abrasive powders with respect to the weight per unit area of packaged abrasive powders, calculated using theoretical density.

TABLE 1

| EMBODIMENT NO. | POROUS RATE (%) | FAT AND OIL (weight %) | VOLUME DIFFERENCE (%) | NOTE |
| --- | --- | --- | --- | --- |
| 1 | 50 | 0.30 | 0.63 | |
| *2 | 0 | 0.00 | 5.12 | |
| 3 | 7 | 0.00 | 2.98 | |
| 4 | 12 | 0.00 | 1.73 | |
| 5 | 75 | 0.00 | 1.23 | |
| 6 | 80 | 0.00 | | The shortage of the abrasive powders causes this embodiment to be bad. |
| 7 | 0 | 0.05 | 2.24 | |
| 8 | 0 | 0.50 | 1.56 | |
| 9 | 0 | 1.00 | 2.77 | |
| *10 | 0 | 1.20 | 3.31 | |

In Table 1, results of the embodiments 2 to 6 are obtained by changing the porous rate of the abrasive powder without adding vegetable fat and oil in the embodiment 1.

In Table 1, results of the embodiments 7 to 10 are obtained by employing nonporous $Al_2O_3$ as the abrasive powder while changing amount of fat and oil in the embodiment 1.

According to Table 1, the volume difference can be controlled within less than 3.0% by using the porous abrasive powder and within less than 2.0% by using the abrasive powder having 10 to 50% of porous rate. Additionally, the volume difference can be controlled within less than 3.0% by adding 0.05 to 1.00% of fat and oil. Preferably, the volume difference can be controlled within less than 1.0% by the combination of the foregoing embodiments.

As described above, during the abrasion of the multilayered ceramic body 3, the abrasive powders can make not only the edge portion of the multilayered ceramic body 3 be smoothed but also the undesirable wastes produced in the process from the multilayered ceramic body 3 adhere thereto, which will, in turn, prevent the internal or the external electrodes from being contaminated by the undesirable wastes, thereby resulting in the multilayered ceramic electronic component having uniform electrical properties.

While the present invention has been shown and described with reference to the particular embodiments, it will be apparent to those skilled in the art that many changes and modifications may be made without departing from the spirit and scope of the invention defined in the appended claims.

What is claimed is:

1. A method for fabricating a multilayered ceramic electronic component, comprising the steps of:
    preparing a multilayered ceramic body and abrasive powders into an abrader;
    abrading the multilayered ceramic body for smoothing edge portions of the multilayered ceramic body, wherein undesirable wastes produced from the multilayered ceramic body during the abrading step are adhered to the abrasive powders; and
    separating the multilayered ceramic body from the abrasive powders to thereby remove the undesirable wastes from the multilayered ceramic body.

2. The method of claim 1, wherein the abrasive powders are porous.

3. The method of claim 2, wherein a porous portion included in the abrasive powders is between about 10% and 75%.

4. The method of claim 1, wherein the abrasive powders include fat and oil.

5. The method of claim 4, wherein the fat and oil included in the abrasive powders is about 0.05 weight % 1.00 weight %.

6. The method of claim 1, wherein a hardness of the abrasive powders included is between about 1.0 Mou's and 5.0 Mou's.

7. The method of claim 1, wherein a specific gravity of the abrasive powders is about 0.9 to 1.5.

8. The method of claim 1, wherein the abrasive powders include particles whose average diameter is about 0.1 mm to 0.5 mm.

9. The method of claim 1, wherein the step of abrading the multilayered ceramic body is applied prior to a sintering process for the multilayered ceramic body.

10. The method of claim 1, wherein the step of abrading the multilayered ceramic body is applied posterior to the formation of external electrodes.

11. A method for surface-treating a part, comprising the steps of:

preparing the part;

abrading the part by using abrasive powders to smooth a surface of the part, the abrasive powders having means for rendering undesirable wastes produced during the abrading step to adhere to the abrasive powders; and separating the abrasive powders from the part to thereby substantially prevent the undesirable wastes from remaining on the surface of the part.

12. The method of claim 11, the part is an intermediate product of a multilayered ceramic electronic component.

13. The method of claim 11, wherein the rendering means includes pores provided to the abrasive powders.

14. The method of claim 13, wherein a porous portion of the abrasive powders is between about 10% and 75%.

15. The method of claim 13, wherein the rendering means further includes fat and oil contained in the abrasive powders.

16. The method of claim 15, wherein the content of fat and oil contained in the abrasive powders is about 0.05 to 1.00 weight %.

17. The method of claim 15, wherein the rendering means further includes resin.

18. The method of claim 11, wherein a hardness of the abrasive powders is between about 1.0 Mou's and 5.0 Mou's.

19. The method of claim 11, wherein a specific gravity of the abrasive powders is about 0.9 to 1.5 and an average diameter of the abrasive powders is about 0.1 mm to 0.5 mm.

20. The method of claim 11, wherein the abrasive powders are made of a ceramic, a metal or an organic material.

* * * * *